United States Patent [19]

Miyazawa et al.

[11] Patent Number: 5,300,335
[45] Date of Patent: Apr. 5, 1994

[54] LAMINATED DRAW-FORMED CONTAINER HAVING EXCELLENT SHOCK RESISTANCE AND PROCESS FOR PRODUCING THE SAME

[75] Inventors: Tetsuo Miyazawa, Ayase; Masashi Ichishima, Yokohama; Masanori Aizawa, Yokohama; Katsuhiro Imazu, Yokohama; Yasufumi Tadaki, Tokyo, all of Japan

[73] Assignee: Toyo Seikan Kaisha, Ltd., Tokyo, Japan

[21] Appl. No.: 982,625

[22] Filed: Nov. 27, 1992

[30] Foreign Application Priority Data

Nov. 27, 1991 [JP] Japan ................. 3-312731

[51] Int. Cl.⁵ ................. B32B 15/08; C08L 67/02
[52] U.S. Cl. ................. 428/35.8; 428/35.7; 428/35.9; 428/458; 428/480; 428/483; 264/299; 264/319; 264/320; 220/415; 220/906; 413/5; 413/18; 525/444
[58] Field of Search ................. 428/35.8, 458, 480, 428/483, 35.7, 35.9; 220/415, 906; 525/444

[56] References Cited

U.S. PATENT DOCUMENTS

| | | | |
|---|---|---|---|
| 4,362,775 | 12/1982 | Yabe et al. | 428/458 |
| 4,551,368 | 11/1985 | Smith et al. | 525/444 |
| 4,643,925 | 2/1987 | Smith et al. | 525/444 |
| 5,137,762 | 8/1992 | Aizawa et al. | 428/35.8 |
| 5,144,824 | 9/1992 | Kobayashi et al. | 428/35.8 |

FOREIGN PATENT DOCUMENTS

| | | |
|---|---|---|
| 0105826 | 4/1984 | European Pat. Off. |
| 3925141 | 1/1991 | Fed. Rep. of Germany |
| 3-79344 | 4/1991 | Japan |
| 3-87249 | 4/1991 | Japan |
| 1566422 | 4/1980 | United Kingdom |

Primary Examiner—James J. Seidleck
Assistant Examiner—M. L. Warzel
Attorney, Agent, or Firm—Sughrue, Mion, Zinn, Macpeak & Seas

[57] ABSTRACT

A laminated draw-formed container obtained by draw-forming a laminated material of a metal plate on which a resin film is laminated into a cup with bottom, wherein the resin film comprises a polyester composition which contains a polyethylene terephthalate component as a chief component and further contains a polyethylene isophthalate component and a polybutylene terephthalate component, the resin film having a density of from 1.32 to 1.39 g/cc at any part of the container and further having, on the upper part of the container, a trans ratio of ethylene glycol residue of from 0.1 to 1.5 as found by the ATR method, as well as a process for producing the container. The draw-formed container exhibits excellent shock resistance irrespective of the passage of time, and particularly dent resistance and barrier property against corrosive components, as well as intimate adhesion to the metal substrate.

7 Claims, 2 Drawing Sheets

LAMINATED DRAW-FORMED CONTAINER HAVING EXCELLENT SHOCK RESISTANCE AND PROCESS FOR PRODUCING THE SAME

BACKGROUND OF THE INVENTION (1) Field of the Invention

The present invention relates to a laminated draw-formed container having excellent shock resistance (dent resistance) after the lapse of time and to a process for producing the same. More specifically, the invention relates to improving the shock resistance of a container which is produced by draw-forming a laminated material which comprises a metal plate on which a polyester film is laminated.

(2) Description of the Prior Art

Side-seamless cans have heretofore been produced by subjecting a metal blank such as an aluminum plate, a tin plate or a tin-free steel plate to at least one stage of the draw working between a drawing die and a punch thereby to form a cup which consists of a barrel without seam on the side surface thereof and a bottom that is connected to the barrel as a unitary structure in a seamless manner and then, as required, subjecting the barrel to the ironing between an ironing punch and a die thereby to reduce the thickness of the barrel. It has further been known to reduce the thickness of the side wall by bending and elongating the barrel at the curved corner portion of a redrawing die instead of ironing the barrel of the container Japanese Laid-Open Patent Publication No. 258822/1989.

Furthermore, in addition to a widely employed method of applying an organic paint onto the cans that have been formed, there has been known a method of coating a side-seamless can with an organic material by laminating a resin film in advance on the metal blank before it is being put to the forming. According to Japanese Patent Publication No. 34580/1984, a polyester film derived from terephthalic acid and tetramethylene glycol is laminated on a metal blank. In producing re-draw-formed cans by bending and elongation, furthermore, there has further been known to use a metal plate coated with a vinyl organosol, a epoxy, phenolics, a polyester, an acryl or the like.

According to Japanese Laid-Open Patent Publication No. 101930/1991 filed by the present inventors, there has been described a coated metal plate for cans comprising a laminated material of a metal plate, a polyester film layer consisting chiefly of an ethylene terephthalate unit, and, as required, an adhesive primer layer that is interposed between the metal plate and the polyester film layer, wherein said polyester film layer has an X-ray diffraction intensity ratio as defined by the formula, $$R_X = I_A / I_B$$

wherein $I_A$ is an X-ray diffraction intensity by the diffraction plane having a plane gap of about 0.34 nm (CuKα X-ray diffraction angle is from 24° to 28°) which is in parallel with the surface of the polyester film, and $I_B$ is an X-ray diffraction intensity by the diffraction plane having a plane gap of about 0.39 nm (CuKα X-ray diffraction angle is from 21.5° to 24°) which is in parallel with the surface of the polyester film, of from 0.5 to 15, and has an anisotropic index of the in-plane orientation of crystals of smaller than 30.

However, the metal blank which is coated with an organic material in advance is subject to be damaged by the tools during the step of draw-forming. The portions where the coating is damaged permit the metal to be exposed actually or latently; i.e., the metal elutes out or is corroded starting with these portions. In producing the seamless cans, furthermore, there takes place a plastic flow such that the size increases in the direction of height of the can and the size contracts in the circumferential direction of the can. In fact, however, the plastic flow deteriorates the adhesion between the metal surface and the organic coating. Moreover, residual distortion in the organic coating causes the adhesion between them to decrease with the lapse of time. Such a tendency appears particularly strikingly when the content is canned while it is hot or when the canned content is heat-sterilized at low to high temperatures.

With the draw-formed can made of the above-proposed laminate of a polyester consisting chiefly of a polybutylene terephthalate (PBT) unit, the film layer adheres well to the metal substrate when the degree of crystallinity thereof is suppressed to be small, and the laminated material can be worked fairly favorably. However, the film layer exhibits barrier property against the corrosive components which is about one-half that of the polyethylene terephthalate/isophthalate (PBT/I). There further arise problems in regard to sticking of the film to the tools and thermal resistance of the containers.

On the other hand, the latter draw-formed can obtained by using a laminated material on which the polyethylene terephthalate (PET) and PET/I films are laminated, exhibits excellent barrier property against corrosive components and can be worked fairly well. When a time passes after the content has been filled in the container that is worked, however, there arises a problem in that the coated film loses shock resistance and particularly loses dent resistance.

In this specification, the dent resistance stands for a test for examining whether the coating of the container withstands the breakage or the peeling when an impact or a shock is given to the container to such a degree that leaves trace of hit, and is a very important test for evaluating the practical durability of the cans.

SUMMARY OF THE INVENTION

The object of the present invention therefore is to provide a draw-formed container made of a polyester film-laminated material that exhibits excellent shock resistance irrespective of the lapse of time, and particularly excellent dent resistance and barrier property against corrosive components, as well as adhesion to the metal substrate and various workabilities in combination, and to provide a process for producing the same.

According to the present invention, there is provided a draw-formed container obtained by draw-forming a laminated material of a metal plate on which a resin film is laminated into a cup with bottom, wherein a laminated draw-formed container having excellent shock resistance is characterized in that said resin film comprises a polyester composition which contains a polyethylene terephthalate component as a chief component and further contains a polyethylene isophthalate component and a polybutylene terephthalate component, and said resin film has a density of from 1.32 to 1.39 g/cc at any part of the container and has, on the upper part of the container, a trans ratio of ethylene glycol residue of from 0.1 to 1.5 as found by the ATR (attenuated total reflection) method.

According to the present invention, furthermore, there is provided a process for producing a laminated draw-formed container having excellent shock resistance comprising deep-draw-forming a laminated material into a cup with bottom between a punch and a die, said laminated material being obtained by laminating onto a metal plate a biaxially drawn film which comprises a polyester composition which contains a polyethylene terephthalate component as a chief component and further contains a polyethylene isophthalate component and a polybutylene terephthalate component, and, as required, reducing the thickness of the side wall of the cup by bending and elongation or by ironing in the final step of draw-forming, and then subjecting the film layer of the thus formed cup with bottom to at least one stage of heat treatment at a temperature of the melting point of the polyester composition ±20° C.

In the polyester composition from which the film is formed according to the present invention, it is desired that the polyethylene terephthalate (PET) component is contained in an amount of from 60 to 97% by weight and, particularly, from 65 to 97% by weight, the polyethylene isophthalate (PEI) component is contained in an amount of from 1 to 39% by weight and, particularly, in an amount of from 1 to 35% by weight, and the polybutylene terephthalate (PBT) component is contained in an amount of 1 to 39% by weight. In this specification, the component stands for the one that is contained as a blend as well as the one that is contained as a copolymerizable segment.

According to the present invention, it is important that the polyester film that constitutes the laminated material contains a PET component as a chief component and further contains a PEI component and a PBT component in relation to the aforementioned properties in combination.

The PET component is indispensable from the standpoint of barrier property of the coating against corrosive components and mechanical strength (tensile strength, modulus of a elasticity) of the coating itself, and serves as a chief component of the polyester composition.

On the other hand, the PET component and the PBT component are indispensable for suppressing the crystallinity of the polyester film, for increasing the adhesion to the metal substrate, for enhancing the formability of the laminated material into a deep-draw-formed cup, and for reducing the thickness of the side wall of the cup.

It is further important to use the above auxiliary components, i.e., the PET component and the PBT component in combination. That is, the PET component works to decrease the rate of crystallization of the polyester and to improve the formability and adhesion without substantially decreasing the barrier property of the polyester film against corrosive components. For instance, a two-component type composition consisting of PET and PBT exhibits good dent resistance but exhibits poor barrier property of the film layer and poor adhesion to the metal as shown in Comparative Example 7 appearing later. However, the three-component type composition consisting of PET, PEI and PBT of the present invention, effectively eliminates the above defects as demonstrated by the working examples.

On the other hand, when a polyester film of a two-component type composition consisting of PET and PEI is used, the laminated draw-formed container exhibits relatively good shock resistance (dent resistance) just after it is formed, but it was found that the dent resistance decreases drastically after a passage of time from when the container is filled with the content (see Comparative Example 2 appearing later). When the three-component type composition is used by blending the PBT component as contemplated by the present invention, on the other hand, the dent resistance after the passage of time is greatly improved as demonstrated by the working examples.

According to the present invention, it is important that the film composed of a three-component type polyester composition of PET, PEI and PBT has a density over a range of from 1.32 to 1.39 g/cc at any part of the container as measured by the density gradient method. That is, when the density of the film layer is smaller than the above range, the film itself tends to lose the barrier property (particularly, increasing the tendency of corrosion), and is likely to be broken which becomes a cause of leakage in the step of wrap-seaming which is an indispensable step for the production of canned products (see Comparative Example 7 appearing later). When the density of the film layer is greater than the above range, on the other hand, cracks develop in the film layer of the BHR portion during the wrap-seaming (see Comparative Example 5 described later).

According to the present invention as described above, it is essential that the film layer has a density that lies within the above-mentioned range at any part of the container and further has, at the upper part of the container, a trans ratio of ethylene glycol residue of from 0.1 to 1.5 as found by the attenuated total reflection (ATR) method, from the standpoint of dent resistance and corrosion resistance of the container, and wrap-seaming performance (leakage resistance).

The ethylene glycol residues exist in the polyester in the trans form and in the gauche form. In this specification, the trans ratio refers to the one that is measured in a working example described later. The glycol residues in the polyester are arranged in the trans form when they are crystalline. However, the method specified by the present invention, i.e., the trans ratio found by the ATR method has a meaning which is different from the degree of crystallization determined by the so-called density method. That is, the degree of crystallinity based on the density method stand for an average degree of crystallinity of the whole film layer (whole thickness) whereas the trans ratio based on the ATR method stands for a degree of crystallinity of the very surface (usually, 1.5 to 4.0 um thick) of the film. Moreover, the portion to be measured is specified to be the upper part of the container. This is because, the monoaxial orientation due to the draw-forming tends to remain mostly in the upper part, and besides a portion to be wrap-seamed to the closure is the upper part of the container, too.

When the trans ratio of the polyester layer at the upper part of the container is greater than the above-mentioned range, the film tends to be cracked at the BHR portion of the container that is wrap-seamed to the closure giving rise to the occurrence of metal corrosion and leakage. When this value is smaller than the above range, furthermore, there takes place under-film corrosion due to a decrease in the barrier property and the dent resistance decreases.

In the present invention, the density and the trans ratio of ethylene glycol residues of the polyester film of the container have relations to both the chemical composition of the polyester composition and the heat-treating conditions after the draw-forming. As for the former relation, it becomes basically necessary to use the PET, PEI and PBT components at the above-mentioned weight ratios. The latter relation will be described hereinbelow.

In the production of the draw-formed container according to the present invention, the biaxially drawn film of the aforementioned polyester is laminated on a metal plate. The biaxially drawn film is used from the standpoint of lamination operation; i.e., the polyester film can be laminated on the metal plate constantly and maintaining a uniform thickness without developing coating defects such as swelling and wrinkles.

The laminated material is deep-draw-formed into a cup with bottom between a punch and a die and, as required, the thickness of the side wall of the cup is reduced by bending and elongation or by ironing in the step of draw-forming. The above methods of forming and working have been widely known, and can be done in a customary manner.

According to the process of the present invention, the film layer of the cup with bottom that is formed is subjected to at least one stage of heat-treatment at a temperature of the melting point of the polyester composition ±20° C. In this specification, the melting point refers to a temperature that is measured as a heat absorption peak by melting in the scanning-type differential thermal analysis DSC. When a plurality of heat absorption peaks are exhibited, the melting point stands for the heat absorption peak temperature attributable to PET/I that is a major component of the polyester. Through the heat treatment at the above-mentioned temperature, the film of the polyester composition exhibits the above-mentioned properties making it possible to obtain excellent dent resistance that does not change with the lapse of time, corrosion resistance, and leakage resistance in combination.

According to the present invention which uses the above polyester composition and the heat-treatment conditions, the aforementioned excellent properties in combination were found as phenomena presumably due to the reasons described below.

The draw-formed containers made of the conventional polyester film-laminated material lose the dent resistance to a considerable degree with the lapse of time due to a change in the fine structure of the amorphous phase in the polyester in addition to a conversion of the amorphous phase into a crystalline phase. In general, the polyester molecular chains (molecular chain arrangements) in the order of several hundred angstroms as a unit that form in the polyester, have been known as a physical aging, or environmental aging (not yet confirmed crystallographically). When the pseudo-crystallization phenomenon develops, the area of the heat absorption peak of DSC slightly increases due to the glass transition temperature (Tg), and the peak shifts toward the high temperature side.

In the polyester composition of the present invention, it is considered that the PET/I component or the PET/PEI component exists as a continuous phase and the PBT component exists as a dispersion phase due to the difference in the constituent units. That is, it is considered that they exist maintaining a so-called sea-island relationship. in he biaxially drawn film layer on the container just after draw-formed, the PBT component may exist in a drawn condition due to the drawing during the draw-forming. In the above-mentioned step of heat treatment, however, the PBT component melts, first, and then disperses as fine particles into the film layer. Besides, it is considered that the PBT component exists as a fine crystalline phase in the final film layer since it has a larger crystallization rate than that of other polyester components. It is presumed that the crystalline phase of the PBT component prevents the other polyester components from developing physical aging, or environmental aging or from being crystallized into larger sizes, thus contributing to improving the dent resistance after the lapse of time.

DETAILED DESCRIPTION OF THE PREFERRED EMBODIMENTS

Figure 1:
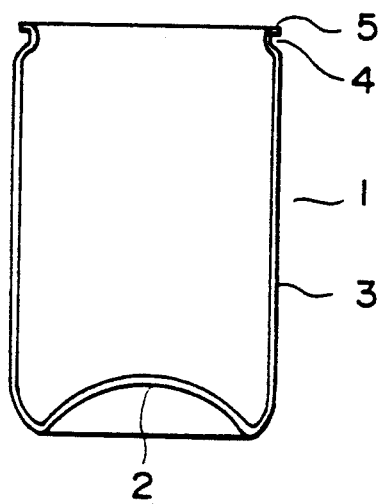
FIG. 1 is a sectional view showing a laminated draw-formed container according to the present invention.

Referring to FIG. 1, a draw-formed can of the present invention is obtained by deep-draw-forming (draw-redraw-forming) the coated metal plate that was mentioned earlier, and comprises a bottom 2 and a side wall 3. As required, a flange 5 is formed at the upper end of the side wall 3 via a neck 4. In this can 1, the side wall 3 has a thickness smaller than that of the bottom 2 due to bending and elongation.

Figure 2:
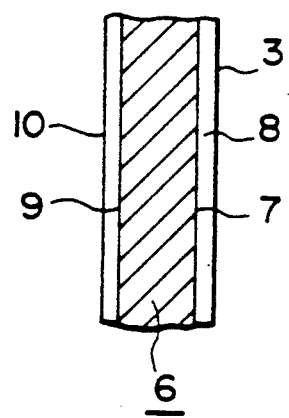
FIG. 2 is a diagram showing a sectional structure of the side wall of the laminated draw-formed container of the present invention.
Figure 3:
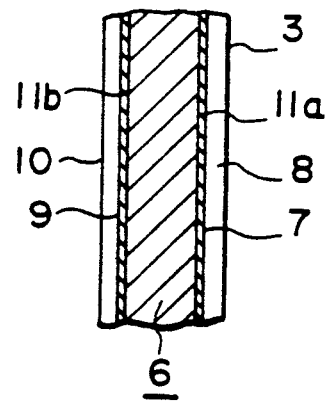
FIG. 3 is a diagram showing another sectional structure of the side wall of the laminated draw-formed container of the present invention.

Referring to FIG. 2 which shows a sectional structure of the side wall 3, it will be understood that the side wall 3 comprises a metal substrate 6, an inner organic coating 8 formed on a surface 7 thereof, and an outer coating 10 formed on the other surface 9 thereof. Referring to FIG. 3 which shows another sectional structure, the side wall has the same structure as that of FIG. 2 but is different in regard to that adhesive layers 11a and 11b are interposed between the metal surface 7 and the inner organic coating 8, and between the metal surface 9 and the outer organic coating 10, respectively.

In either case, the bottom 2 has the same sectional structure as the section structure of the side wall 3.

Metal Blank

According to the present invention, a variety of surface-treated steel plates and light metal plates such as of aluminum are used as metal plates.

As the surface-treated steel plate, there can be used a cold-rolled steel plate which is annealed, put to the secondary cold-rolling, and is subjected to one or two or more kinds of surface treatments such as zinc plating, tin plating, nickel plating, electrolytic chromate treatment and chromate treatment. A preferred example of the surface-treated steel plate is an electrolytically chromate-treated steel plate having a metal chromium layer of 10 to 200 mg/m$^2$ and a chromium oxide layer of 1 to 50 mg/m$^2$ (reckoned as metal chromium), and featuring excellent coating adhesiveness and corrosion resistance in combination. Another example of the surface-treated steel plate is a hard tin plate having a tin plating in an amount of from 0.5 to 11.2 g/m². It is desired that the tin plate is subjected to the chromate treatment or to the chromate/phosphate treatment such that the amount of chromium is from 1 to 30 mg/m² reckoned as metal chromium.

There can further be used an aluminum-coated steel plate to which aluminum is plated or aluminum is press-adhered.

As the light metal plate, there can be used a so-called pure aluminum plate or an aluminum alloy plate. The aluminum alloy plate having excellent corrosion resistance and workability has a composition of from 0.2 to 1.5% by weight of Mn, 0.8 to 5% by weight of Mg, 0.25 to 0.3% by weight of Zn, 0.15 to 0.25% by weight of Cu, and the remainder of Al. It is desired that the light metal plate is subjected to the chromate treatment or to the chromate/phosphate treatment such that the amount of chromium is from 20 to 300 mg/m² reckoned as metal chromium.

The blank thickness of the metal plate, i.e., the thickness ($t_B$) of the bottom of the can generally ranges from 0.10 to 0.50 mm though it may vary depending on the kind of metal and the use of the container, and should range from 0.10 to 0.30 mm in the case of the surface-treated steel plate and should range from 0.15 to 0.40 mm in the case of the light metal plate.

Inner Coating and Outer Coating

According to the present invention, the film of the aforementioned polyester composition is used as the inner coating, as the outer coating, or as both the inner coating and the outer coating.

The polyester composition consists of three components of PET, PEI and PBT. For instance, there can be used a copolyester blend consisting of a polyethylene terephthalate, a polyethylene isophthalate and a polybutylene terephthalate, or a tetracopolyester obtained by the polycondensation of a terephthalic acid ester of an ethylene glycol, an isophthalic acid ester of an ethylene glycol and a terephthalic acid ester of a 1,4-butanediol. A preferred composition contains these three components at the above-mentioned weight ratio. More preferably, the polyester composition contains the PBT component in the form of a blend, and contains the PEI component in the form of a copolymer with the PET component.

When applied to the container to form a coating layer, the polyester film should have an inherent viscosity [$\eta$] of from 0.5 to 1.50, and particularly from 0.50 to 1.10. From the standpoint of barrier property against corrosive components and the formability, furthermore, the film should, generally, have a thickness of from 1 to 100 μm and, particularly, from 5 to 70 μm.

From the standpoint of lamination operation, it is important that the film that is laminated must have been biaxially drawn. The degree of biaxial orientation can be confirmed by the X-ray diffraction method, polarized fluorescence method, double refraction method, density gradient tube method or the like method.

The biaxially drawn film may of course be blended with blending agents that have been known per se. such as an anti-blocking agent like amorphous silica or the like, a pigment like titanium dioxide (titanium white) or the like, various antistatic agents, and a lubricating agent according to a known recipe.

When the primer for adhesion is to be used, it is generally desired to treat the surface of the biaxially drawn copolyester film with a corona discharge in order to enhance the adhesion of the adhesive primer to the film. The corona discharge treatment should be effected to such a degree that the wet tensile force thereof is greater than 44 dyne/cm.

It is further, allowable to treat the film with a plasma, with flame, or with any known surface treatment that helps increase the adhesion, or to apply coating such as of a modified polyester resin to increase the adhesion.

When the film of the aforementioned polyester composition is used as the inner coating only according to the present invention, there can be used as the outer coating any outer paint which has been known per se. in the production of cans, a polyester film which has been known per se. or any other plastic film. Examples of the paint include thermosetting resin paints that have heretofore been used in the production of cans, such as a phenol-aldehyde resin, a furan resin, a xylene-formaldehyde resin, a ketone-formaldehyde resin, a urea resin, a melamine resin, an aniline resin, an alkid resin, a guanamine resin, an unsaturated polyester resin, an epoxy resin, a thermosetting acrylic resin, a triallylcyanurate resin, a bismaleimide resin, an oleoresinous paint, a thermosetting acrylic paint, and a thermosetting vinyl paint which may used alone or in a combination of two or more kinds.

Adhesive Primer

The adhesive primer that is provided as desired between the polyester film and the metal blank exhibits excellent adhesion to both the metal blank and the film. A representative example of the primer paint that exhibit excellent adhesion and corrosion resistance is a phenol epoxy-type paint which comprises a resol-type phenol-aldehyde resin derived from various phenols and formaldehydes, and a bisphenol epoxy resin, and, in particular, is the one that contains the phenol resin and the epoxy resin at a weight ratio of from 50:50 to 5:95 and, particularly, at a weight ratio of from 40:60 to 10:90.

The adhesive primer layer should be formed, usually, maintaining a thickness of from 0.01 to 10 μm.

The adhesive primer layer may be provided on the metal blank or on the polyester film in advance.

Method of Production

According to the present invention, the biaxially drawn polyester film and the metal blank are laminated together. For instance, the two members are laminated together by being press-adhered under the condition where the surface only of the film in contact with the metal blank is melted. In this case, the metal blank is heated in advance at a temperature higher than the softening-point of the polyester (heat-setting temperature of the film), and the laminated material is quickly quenched just after it is laminated.

According to another method, furthermore, the biaxially drawn polyester film and the metal blank are laminated together by being press-adhered via the adhesive primer layer that is provided for either one of them.

Figure 4:
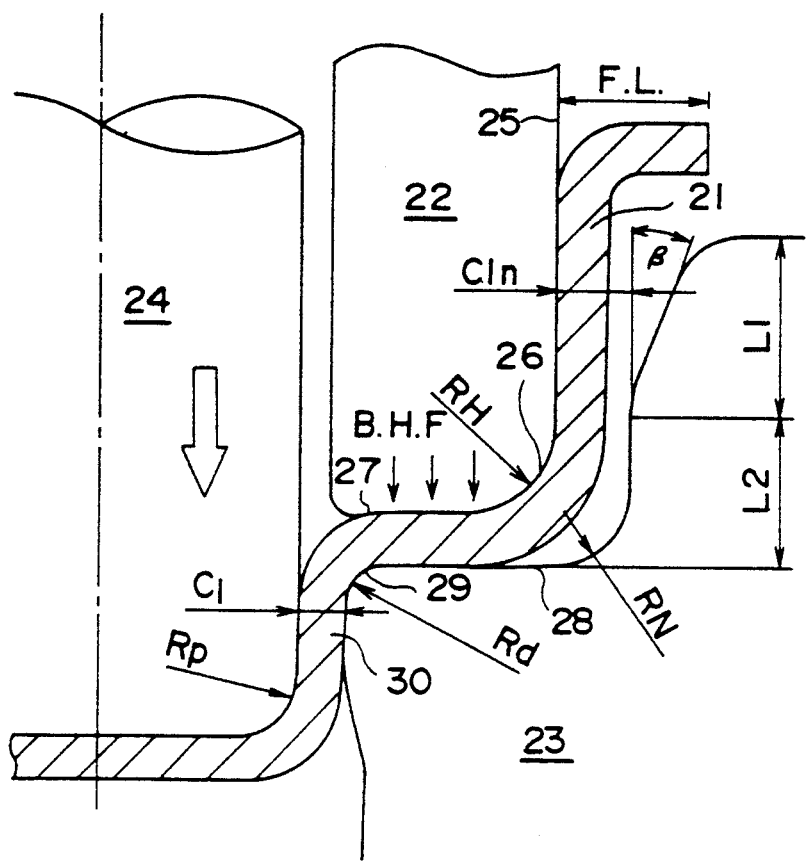
FIG. 4 is a diagram illustrating a step of redraw-forming employed for the production of the container of the present invention.

The thus obtained laminated material is subjected to the draw-forming according to a means which has been known per se. According to the deep-draw-forming (draw-redraw-forming) as shown in FIG. 4, a predraw-formed cup 21 is held by an annular holding member 22 inserted in the cup and by a redrawing die 23 positions thereunder. A redrawing pinch 24 is provided in concentric with the holding member 22 and the redrawing die 23, and so as to go into or come out of the holding member 22. The redrawing punch 24 and the redrawing die 23 are moved relative to each other so that they are in mesh together.

The side wall of the predraw-formed cup 21 is bent at right angles toward the radial direction from the outer peripheral surface 25 of the annular holding member 22 passing through a curved corner portion 26 thereof, passes through a portion defined by the annular bottom surface 27 of the annular holding member 22 and the upper surface 28 of the redrawing die 23, and is bent nearly vertically in the axial direction by a working corner portion 29 of the redrawing die 23, and whereby a deep-draw-formed cup 30 is obtained having a diameter smaller than that of the predraw-formed cup 21. It is further possible to reduce the thickness of the side wall by bending and elongation.

In the case of the deep-draw-formed can, the draw ratio defined by the following formula, $$R_D = D/d$$

wherein D denotes the diameter of the laminated material that is sheared, and d denotes the punch diameter, should be from 1.1 to 3.0 through one stage, and should be from 1.5 to 5.0 as a total.

Through the bending and elongation, the thickness of the side wall of the can should be reduced to 5 to 45% and, particularly, 5 to 40% of the blank thickness ($t_B$).

According to the present invention, the draw-formed container is then subjected to the heat treatment under the conditions mentioned earlier. The heat treatment can be carried out by using a known heating device such as an infrared-ray heater, a hot-air circulation furnace, an induction heating device or the like. The heat treatment can be carried out through one stage or through two or more stages.

It should be well comprehended that according to the present invention, the container after the heat treatment needs not be quickly quenched. That is, though the film and the laminated plate can be quickly quenched with ease, the container which has a three-dimensional shape and a large heat capacity due to metal requires cumbersome operation for quick quenching when it is to be carried out on an industrial scale. According to the present invention, however, the crystal growth is suppressed owing to the aforementioned actions even without the quick quenching, and excellent properties are obtained in combination. As required, however, there may be employed a quickly quenching means such as blowing the cold air or sprinkling the cold water, as a matter of course.

The invention will now be described by way of the following examples. In the following examples and comparative examples, the densities, inherent viscosities and trans ratios of the samples are measured in compliance with the methods which are described below.

(1) Density

Figure 5:
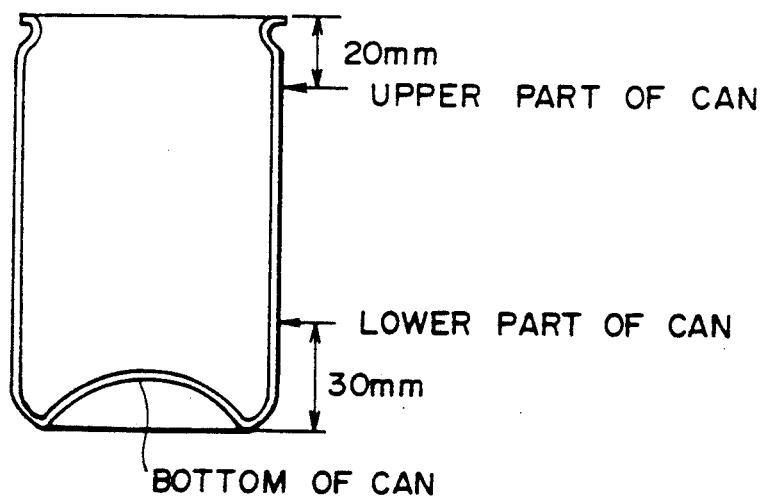
FIG. 5 is a diagram illustrating the sampling sites for measuring the densities of the laminated draw-formed containers.

The values are measured at 23° C. after two hours by the density gradient tube method. The sampling sites are as shown in FIG. 5. The upper part and the lower part of the can are cut in a direction at right angles with the direction in which the metal plate is rolled. As for the bottom of the can, the central portion was cut measuring 3 mm×3 mm. After the outer coating is removed by grinding, the thus cut metal layers are dissolved in a 50%-dilute hydrochloric acid followed by drying in vacuum for at least 24 hours to obtain free films.

(2) Trans ratio

The infrared-ray absorption by the surface of the film (surface layer and the layer on the side of the metal plate) is measured by the FT-IR, ATR method, and the trans ratio is found according to the following formula, $$\text{Trans ratio} = I_{973}/I_{1407}$$

where, $I_{973}$: absorption intensity at 973 cm$^{-1}$ $I_{1407}$: absorption intensity at 1407 cm$^{-1}$ The sample of ATR measurement has a shape measuring 10 mm in the direction of height of the can and 25 mm in the circumferential direction of the can. The sample is so mounted that the infrared light is incident from the circumferential direction of the can.

(3) Inherent viscosity

The inherent viscosity [$\eta$] is found from an extrapolation value of a viscosity/concentration curve measured at 30° C. by dissolving the free film cut from a predetermined position of the can in orthochlorophenol.

$$[\eta] = \lim_{C \to 0}\left(\frac{\eta_{sp}}{C}\right) = \lim_{C \to 0}\left(\frac{\eta - \eta_0}{\eta_0 C}\right) = \lim_{C \to 0}\left(\frac{\log \eta_r}{C}\right) \cdot \left(\frac{ml}{g}\right)$$

wherein, $\eta$: coefficient of viscosity of the solution,
$\eta_0$: coefficient of viscosity of the pure solvent,
$\eta_{sp}$: specific viscosity,
$\eta_r$: relative viscosity.

(4) Dent ERV (Enamel rater value of dented-portion)

The can filled with water is preserved in an atmosphere of 37° C. for one week. Thereafter, the bottom of the can is cut out and is brought on its inner surface side in contact with a silicone rubber having a thickness of 3 mm and a hardness of 50° at room temperature under humid condition. A steel ball having a diameter of ⅝ inch is placed on the side of the outer surface, and a weight of 1 kg is permitted to fall from a height of 40 mm to effect the impact dent working.

The degree of cracking of the polyester film at the impact-worked portion is measured in terms of a current value by applying a voltage of 6.30 V, and an average value is found from five such cracks.

(5) Cola preservation test

The can filled with cola is preserved at room temperature for one week. A steel rod having a diameter of 10 mm is placed at the bottom radium portion, and a weight of 500 g is permitted to fall from a height of 60 mm to give impact thereto. The can is then preserved at room temperature and examined for its condition after three months and after one year, respectively.

EXAMPLE 1

A biaxially drawn polyester film of a composition shown in Table 1 (a biaxially drawn film composed of a blended resin of a polyethylene terephthalate/isophthalate copolymer and a polybutylene terephthalate, drawn at a ratio of 3.0 in the vertical direction and 3.0 in the lateral direction) having a thickness of 25 μm was heat-laminated at a melting point of the film onto both surfaces of a tin-free steel (TFS) plate having a blank thickness of 0.165 mm and a refining degree of DR-9, and was immediately cooled with water to obtain a metal plate having an organic coating. A petrolatum was applied onto the coated metal plate from which a disk having a diameter of 179 mm was punched to obtain a shallow-draw-formed cup at 80° C. in a customary manner. The draw ratio in this step of draw-forming was 1.56. The draw-formed cup was then preheated at 80° C. and was subjected to the primary and secondary redraw-forming steps for reducing the thickness. The redraw-forming steps were carried out under the following change.

| Primary redraw ratio | 1.37 |
| Secondary redraw ratio | 1.27 |

The thus obtained deep-draw-formed cup exhibited the following properties.

| Diameter of cup | 66 mm |
| Height of cup | 128 mm |
| Change in the thickness of side wall | −20% |

The deep-draw-formed cup was domed at 80° C. in a customary manner, heat-treated at 210° C., left to cool, and then the opening edge was trimmed, printed on its curved surface and flanged, thereby to obtain a 350 g two-piece can. The can was then subjected to the denting test, filled with cola, preserved, and was examined in regard to the inner surface condition thereof and leakage. Table 1 shows the properties of the cans and the results of evaluation. The preservation test showed no particular abnormal change of the cans.

EXAMPLE 2

By using a metal plate having an organic coating obtained by laminating a polyester film having a composition shown in Table 1 (the same blended resin film as that of Example 1 except the composition, drawn at a ratio of 3.0 in the vertical direction and 3.0 in the lateral direction), the same procedure was carried out as in Example 1 but under the heat treatment conditions shown in Table 1. Properties of the cans and the results of evaluation thereof were as shown in Table 1. The preservation test showed no particular abnormal change of the cans.

EXAMPLE 3

By using a metal plate having an organic coating obtained by laminating a polyester film having a composition shown in Table 1 (the same blended resin film as that of Example 1 except the composition, drawn at a ratio of 3.6 in the vertical direction and 3.6 in the lateral direction), the same procedure was carried out as in Example 1 but under the heat treatment conditions shown in Table 1. Properties of the cans and the results of evaluation thereof were as shown in Table 1. The preservation test showed no particular abnormal change of the cans.

EXAMPLE 4

By using a metal plate having an organic coating obtained by laminating a polyester film having a composition shown in Table 1 (the same blended resin film as that of Example 1 except the composition, drawn at a ratio of 3.0 in the vertical direction and 3.0 in the lateral direction), the same procedure was carried out as in Example 1 but under the heat treatment conditions as shown in Table 1. Properties of the cans and the results of evaluation thereof were as shown in Table 1. The preservation test showed no particular abnormal change of the cans.

EXAMPLE 5

By using a metal plate having an organic coating obtained by laminating a polyester film having a composition shown in Table 1 (the same blended resin film as that of Example 1 except the composition, drawn at a ratio of 3.6 in the vertical direction and 3.6 in the lateral direction), the same procedure was carried out as in Example 1 but under the heat treatment conditions shown in Table 1. Properties of the cans and the results of evaluation thereof were as shown in Table 1. The preservation test showed no particular abnormal change of the cans.

EXAMPLE 6

By using a metal plate having an organic coating obtained by laminating a polyester film having a composition shown in Table 1 (the same blended resin film as that of Example 1 except the composition, drawn at a ratio of 3.6 in the vertical direction and 3.6 in the lateral direction), the same procedure was carried out as in Example 1 but using grammer wax instead of petrolatum and under the heat treatment conditions shown in Table 1. Properties of the cans and the results of evaluation thereof were as shown in Table 1. The preservation test showed no particular abnormal change of the cans.

COMPARATIVE EXAMPLE 1

The same procedure was carried out as in Example 1 but using a metal plate having an organic coating obtained by laminating a polyester film of a composition shown in Table 1 and under the heat treatment conditions shown in Table 1. The dent ERV was great. After the preservation for three months, the film had been cracked at the bottom radius portion on all of the 100 cans to which impact was given. Further, the film had been cracked by about 30% along the whole circumference on the wrap-seamed BHR portion and the metal surface had been corroded. After the preservation for one year, leakage due to pitting had been taking place on 78 cans among 100 cans.

COMPARATIVE EXAMPLE 2

The same procedure was carried out as in Example 1 but using a metal plate having an organic coating obtained by laminating a polyester film of a composition shown in Table 1 and under the heat treatment conditions shown in Table 1. Properties of the cans and the results of evaluation thereof were as shown in Table 1. The dent ERV was great. After the preservation for three months, the film had been cracked at the bottom radius portion on all of the 100 cans to which impact was given. Further, the film had been cracked nearly along the whole circumference on the wrap-seamed BHR portion and the metal surface had been corroded. After the preservation for one year, leakage due to pitting had been taking place on all of 100 cans.

COMPARATIVE EXAMPLE 3

The same procedure was carried out as in Example 1 but using a metal plate having an organic coating obtained by laminating a polyester film of a composition shown in Table 1 and under the heat treatment conditions shown in Table 1. Properties of the cans and the results of evaluation thereof were as shown in Table 1. The dent ERV was great. After the preservation for three months, however, the film had been cracked at the bottom radius portion on all of the 100 cans to which impact was given, and the metal surface had been corroded. After the preservation for one year, leakage due to pitting had been taking place on all of 100 cans.

COMPARATIVE EXAMPLE 4

The same procedure was carried out as in Example 1 but using a metal plate having an organic coating obtained by laminating a polyester film of a composition shown in Table 1 and under the heat treatment conditions shown in Table 1. Properties of the cans and the results of evaluation thereof were as shown in Table 1. The dent ERV was small. After the preservation for three months, however, the film had been floating at the neck portion of the barrel and the metal surface had been corroded on 30 cans among 100 cans. After the preservation for one year, furthermore the metal surface had been further corroded under the film on the neck portion on all 100 cans.

COMPARATIVE EXAMPLE 5

The same procedure was carried out as in Example 1 but using a metal plate having an organic coating obtained by laminating a polyester film of a composition shown in Table 1 and under the heat treatment conditions shown in Table 1. Properties of the cans and the results of evaluation thereof were as shown in Table 1. The dent ERV was small. After the preservation for three months, however, the film had been cracked by about 10% along the whole circumference on the wrap-seamed BHR portion and the metal surface had been corroded on 55 cans among 100 cans. After the preservation for one year, furthermore, leakage due to pitting had been taking place on 20 cans among 100 cans.

COMPARATIVE EXAMPLE 6

The same procedure was carried out as in Example 1 but using a metal plate having an organic coating obtained by laminating a polyester film of a composition shown in Table 1 and under the heat treatment conditions shown in Table 1. Properties of the cans and the results of evaluation thereof were as shown in Table 1. The dent ERV was great. After the preservation for three months, the film had been cracked at the bottom radius portion on all of the 100 cans to which impact was given, and the metal surface had been corroded. After the preservation for one year, leakage due to pitting had been taking place in the bottom radius portion on 38 cans among 100 cans.

COMPARATIVE EXAMPLE 7

The same procedure was carried out as in Example 1 but using a metal plate having an organic coating obtained by laminating a polyester film of a composition shown in Table 1 and under the heat treatment conditions shown in Table 1. Properties of the cans and the results of evaluation thereof were as shown in Table 1. The dent ERV was small. After the preservation for three months, however, the film had been floating at the neck portion of the can barrel and the metal surface had been corroded on 30 cans among 100 cans. After the preservation for one year, furthermore, the metal surface had been further corroded under the film on the neck portion on all 100 cans, and leakage due to pitting had been taking place on 10 cans among 100 cans.

TABLE 1

| Sample No. | Weight ratio of resin composition PET/PEI/PBT | Melting point of film (°C.) | Heat treatment temp. (°C.) Step of lubricant vaporization | Heat treatment temp. (°C.) Step of printing on curved surface | Film density (g/cc) bottom of can | Film density (g/cc) lower part of can | Film density (g/cc) upper part of can |
|---|---|---|---|---|---|---|---|
| Ex. 1 | 66/9/25 | 218 | 210 | 205 | 1.345 | 1.349 | 1.353 |
| Ex. 2 | 68/7/25 | 232 | 220 | 205 | 1.372 | 1.372 | 1.375 |
| Ex. 3 | 71/4/25 | 239 | 230 | 205 | 1.373 | 1.374 | 1.377 |
| Ex. 4 | 75/10/15 | 222 | 210 | 205 | 1.375 | 1.377 | 1.385 |
| Ex. 5 | 85/5/10 | 240 | 230 | 205 | 1.384 | 1.387 | 1.391 |
| Ex. 6 | 73/2/25 | 244 | 230 | 205 | 1.375 | 1.377 | 1.382 |
| Comp. Ex. 1 | 100/0/0 | 255 | 250 | 240 | 1.390 | 1.393 | 1.401 |
| Comp. Ex. 2 | 88/12/0 | 228 | 250 | 205 | 1.343 | 1.345 | 1.345 |
| Comp. Ex. 3 | 88/12/0 | 228 | 220 | 205 | 1.389 | 1.391 | 1.396 |
| Comp. Ex. 4 | 88/12/0 | 230 | 220 | 205 | 1.338 | 1.336 | 1.339 |
| Comp. Ex. 5 | 85/5/10 | 240 | 190 | 190 | 1.392 | 1.399 | 1.415 |
| Comp. Ex. 6 | 73/2/25 | 244 | 270 | 270 | 1.335 | 1.334 | 1.339 |
| Comp. Ex. 7 | 25/0/75 | 220 | 230 | 205 | 1.318 | 1.316 | 1.325 |

| Sample No. | Trans ratio surface side | Trans ratio metal side | (cc/g) | Dent ERV (mA) after 1 week at 37° C. | Cola preservation test N = 100 After 3 months at room temp. | Cola preservation test N = 100 After 1 year at room temp. |
|---|---|---|---|---|---|---|
| Ex. 1 | 0.34 | 0.67 | 0.67 | 0.01 | no abnormality | no abnormality |
| Ex. 2 | 0.45 | 0.68 | 0.62 | 0.01 | " | " |
| Ex. 3 | 0.71 | 0.84 | 0.65 | 0.01 | " | " |
| Ex. 4 | 0.43 | 0.74 | 0.62 | 0.01 | " | " |
| Ex. 5 | 0.85 | 0.95 | 0.63 | 0.01 | " | " |
| Ex. 6 | 0.75 | 0.88 | 0.61 | 0.01 | " | " |
| Comp. Ex. 1 | 1.30 | 1.61 | 0.65 | 4.53 | bottom radius portion corroded, BHR portion cracked and corroded. | leakage due to pitting 78/100 |
| Comp. Ex. 2 | 0.095 | 0.098 | 0.64 | 9.82 | bottom radius portion corroded, BHR portion cracked and corroded. | leakage due to pitting 100/100 |

TABLE 1-continued

| | | | | | | |
|---|---|---|---|---|---|---|
| Comp. Ex. 3 | 0.94 | 0.85 | 0.48 | 10.05 | bottom radius portion corroded. | leakage due to pitting 100/100 |
| Comp. Ex. 4 | 0.045 | 0.080 | 1.15 | 0.01 | neck portion flated and corroded. | neck portion corroded greatly. |
| Comp. Ex. 5 | 1.34 | 1.75 | 0.52 | 0.01 | BHR portion cracked and corroded. | leakage due to pitting 20/100 |
| Comp. Ex. 6 | 0.042 | 0.055 | 0.61 | 3.62 | bottom radius portion corroded. | leakage due to pitting 38/100 |
| Comp. Ex. 7 | 0.031 | 0.067 | 0.58 | 0.01 | neck portion floated and corroded. | neck portion greatly corroded. leakage due to pitting 10/100 | note)
Ex.: Example,
Comp. Ex.: Comparative Example.

What is claimed is:

1. In a draw-formed container obtained by draw-forming a laminated material of a metal plate on which a resin film is laminated into a cup with a bottom, a laminated draw-formed container having excellent shock resistance, wherein said resin film comprises a polyester composition film heat-treated at a temperature of the melting point of the polyester composition ±20° C., which film contains 60-97% by weight of a polyethylene terephthalate component, 1 to 39% by weight of a polyethylene isophthalate component and 1 to 39% by weight of a polybutylene terephthalate component, and said resin film has a density of from 1.32 to 1.39 g/cc at any part of the container and has, at the top 20 mm of container height, a trans ratio of ethylene glycol residue of from 0.1 to 1.5 as found by the ATR method.

2. A laminated draw-formed container according to claim 1, wherein said composition that forms said resin film comprises a polyethylene terephthalate/isophthalate copolyester blended with a polybutylene terephthalate.

3. A laminated draw-formed container according to claim 1, wherein said composition that forms said resin film is a polymer blend comprising a polyethylene terephthalate, a polyethylene isophthalate and a polybutylene terephthalate.

4. A laminated draw-formed container according to claim 1, wherein said composition that forms said resin film is a tetracopolyester obtained by the polycondensation of a terephthalic acid mono (or di) ethylene glycol ester, an isophthalic acid (mono) or diethylene glycol ester, and a terphthalic acid (mono) or dibutylene glycol ester.

5. A laminated draw-formed container according to claim 1, wherein said resin film has a inherent viscosity [η], measured at 30° C. in orthochlorophenol solution, of from 0.50 to 1.50.

6. A laminated draw-formed container according to claim 1, wherein said resin film has a thickness of from 1 to 100 μm.

7. A process for producing a laminated draw-formed container having excellent shock resistance comprising the steps of: deep-draw-forming a laminated material into a cup with bottom between a punch and a die, said laminated material being obtained by laminating onto a metal plate a biaxially drawn film which comprises a polyester composition which contains 60 to 97% by weight of a polyethylene terephthalate component, 1 to 39% by weight of a polyethylene isophthalate component and 1 to 39% by weight of a polybutylene terephthalate component, and, as required, reducing the thickness of the side wall of the cup by bending and elongation or by ironing in the step of draw-forming, and then subjecting the film layer of the thus formed cup with a bottom to at least one stage of heat treatment at a temperature of the melting point of the polyester composition ±20° C.

* * * * *